(12) United States Patent
Chun et al.

(10) Patent No.: US 11,390,561 B2
(45) Date of Patent: Jul. 19, 2022

(54) CONTROLLED HYDRATION OF QUICKLIME

(71) Applicant: GCP Applied Technologies Inc., Cambridge, MA (US)

(72) Inventors: Zen Chun, Honolulu, HI (US); Klaus-Alexander Rieder, Beverly, MA (US); Ezgi Yurdakul, Sydney (AU); Antonio J. Aldykiewicz, Lexington, MA (US)

(73) Assignee: GCP Applied Technologies Inc., Alpharetta, GA (US)

( * ) Notice: Subject to any disclaimer, the term of this patent is extended or adjusted under 35 U.S.C. 154(b) by 168 days.

(21) Appl. No.: 16/755,569

(22) PCT Filed: Oct. 13, 2017

(86) PCT No.: PCT/US2017/056604
§ 371 (c)(1),
(2) Date: Apr. 11, 2020

(87) PCT Pub. No.: WO2019/074525
PCT Pub. Date: Apr. 18, 2019

(65) Prior Publication Data
US 2020/0308048 A1    Oct. 1, 2020

(51) Int. Cl.
| | | |
|---|---|---|
| C04B 2/06 | (2006.01) |
| C04B 20/10 | (2006.01) |
| C04B 22/00 | (2006.01) |
| C04B 28/04 | (2006.01) |
| C04B 28/10 | (2006.01) |
| C04B 111/00 | (2006.01) |
| C04B 111/34 | (2006.01) |

(52) U.S. Cl.
CPC .......... *C04B 2/066* (2013.01); *C04B 20/1022* (2013.01); *C04B 20/1029* (2013.01); *C04B 22/008* (2013.01); *C04B 28/04* (2013.01); *C04B 28/10* (2013.01); *C04B 2111/00146* (2013.01); *C04B 2111/00612* (2013.01); *C04B 2111/343* (2013.01)

(58) Field of Classification Search
CPC . C04B 2/066; C04B 20/1022; C04B 20/1029; C04B 22/008; C04B 28/04; C04B 28/10; C04B 2111/00146; C04B 2111/00612; C04B 2111/343
See application file for complete search history.

(56) References Cited

U.S. PATENT DOCUMENTS

| | | |
|---|---|---|
| 4,205,994 A | 6/1980 | Wendell |
| 4,354,877 A | 10/1982 | Fukioka et al. |
| 4,565,579 A | 1/1986 | Fukioka et al. |
| 5,332,436 A | 7/1994 | Walker, Jr. |
| 5,660,626 A | 8/1997 | Ohta et al. |
| 5,669,968 A | 9/1997 | Kobori et al. |
| 5,938,835 A | 8/1999 | Shawl et al. |
| 6,008,275 A | 12/1999 | Moreau et al. |
| 8,277,556 B2 | 10/2012 | Berke et al. |
| 2002/0063527 A1* | 5/2002 | Hayashi .......... H01J 11/36 313/586 |
| 2004/0072939 A1 | 4/2004 | Cornman et al. |
| 2010/0310846 A1 | 12/2010 | Berke et al. |
| 2017/0008810 A1 | 1/2017 | Rademan et al. |

FOREIGN PATENT DOCUMENTS

| | | |
|---|---|---|
| CN | 104193266 | 12/2014 |
| CN | 104496261 | 4/2015 |
| CN | 104986985 | 10/2015 |
| CN | 105198266 | 12/2015 |
| CN | 105349990 A * | 2/2016 |
| CN | 106205770 A * | 12/2016 |
| JP | 2005213072 | 8/2005 |
| JP | 2010126400 | 6/2010 |
| JP | 2014129194 | 7/2014 |
| JP | 2014129210 | 7/2014 |
| JP | 2016124738 | 7/2016 |
| JP | 2010155741 | 7/2020 |
| WO | 2012162292 | 11/2012 |
| WO | 2016185264 | 11/2016 |
| WO | 2017087326 | 5/2017 |
| WO | 2017200543 | 11/2017 |

OTHER PUBLICATIONS

Derwent-Acc-No. 1990-272942 (abstract of Korean Patent Specification No. KR 8903582 B1) (Year: 1989).*
Collepardi, "Effects of shrinkage reducing admixture in shrinkage compensating concrete under non-wet curing conditions", Cement & Concrete Composites 27 (2005) 704-708.
Maltese, "Combined effect of expansive and shrinkage reducing admixtures to obtain stable and durable mortars", Cement and Concrete Research 35 (2005) 2244-2251.
Young, Form PCT/ISA/210, International Search Report for PCT/US2017/056604, dated Jan. 8, 2018, 3 pages.
Young, Form PCT/ISA/237,Written Opinion of the International Searching Authority for PCT/US2017/056604, dated Jan. 8, 2018, 3 pages.
Stein, "Influence of some Additives on the Hydration Reactions of Portland Cement I. Non-ionic Organic Additives" Journal of Chemical Technology and Biotechnology, vol. 11 Issue 12 (Dec. 1961): pp. 474-482.

* cited by examiner

Primary Examiner — Anthony J Green
(74) Attorney, Agent, or Firm — Craig K. Leon; Joseph D. Rossi

(57) ABSTRACT

The present invention provides a liquid composition of quicklime particles within an alkylene glycol-based paste or slurry environment, which allows for pumpability and meterability of a liquid composition into cementitious materials such as concrete and mortar. Treated quicklime particles of the present invention manifest an unexpected and surprising hydration induction postponement behavior, as demonstrated through calorimetric testing.

23 Claims, 5 Drawing Sheets

CONTROLLED HYDRATION OF QUICKLIME

FIELD OF THE INVENTION

The present invention relates to the use of expansion agent admixture for modifying hydratable cementitious materials such as concrete, and more particularly to controlling the hydration of quicklime particles within an alkylene glycol based paste or slurry environment allowing for liquid dispersibility into concrete.

BACKGROUND OF THE INVENTION

It is known to use calcium oxide, which is often referred to as "quicklime," as an expansive agent in concrete, mortar, and other hydratable cementitious compositions to prevent cracking during shrinkage.

It is known also to employ both shrinkage-reducing admixture ("SRA"), calcium oxide, and other admixtures to improve concrete performance in terms of lower of cracking risks due to drying shrinkage. See e.g., "Effects of Shrinkage Reducing Admixture in Shrinkage Compensating Concrete under Non-wet Curing Conditions," Mario Callepardi et al., Cement & Concrete Composites (Elsevier Ltd.), 27(2004), pp. 7004-708; See also "Combined Effect of Expansive and Shrinkage Reducing Admixtures to Obtain Stable and Durable Mortars," C. Maltese et al., Cement & Concrete Research (Elsevier Ltd.), 35(2005), pp. 2244-2251.

Cementitious compositions that contain calcium oxide and SRAs are discussed in the patent literature as well. See e.g., WO 2012/162292 and US 2017/000810 of Premier Magnesia LLC; See also WO 2016/185264 of Holcim Technology Ltd.

Calcium oxide and SRAs have been combined with agents such as polycarboxylate surfactant foam generating agents, foam stabilizers, calcium salt, viscosity modifying agents, and fibers, to achieve various physical properties within the concrete matrix. See e.g., U.S. Pat. No. 8,277,556 of Berke et al., owned by the common assignee hereof.

One of the problems with using calcium oxide, however, is that, upon exposure to water, it undergoes a rapid, highly exothermic reaction that is difficult to control. In U.S. Pat. No. 4,354,877, Kawano et al. taught that calcination processing (i.e., high temperatures around 1400° C.) could attenuate the reactivity of calcium oxide). However, such calcined products do not appear readily available.

The exothermic reaction of calcium oxide is such that, when mixed with calcium fluoride and a retarding agent and heated to between 800°-1400° C., it could be used for "gently" breaking rocks apart. See U.S. Pat. No. 4,565,579 of Fujioka et al.

In Japanese patent application 2005-213072, Nakajima disclosed a granular chemical admixture having which 100 parts by weight of quicklime particles of 65 microns or less, 0.5-10% of a liquid having surface tension above 25 (dyn/cm) and solubility parameter of 9.0-14.3, and preferably low levels of moisture (0-3% by weight or less). Nakajima claimed that the quicklime particles would absorb less moisture from the air by forming a secondary agglomerate, so storage stability could be improved and dusting of powder could be controlled.

In Japanese patent application 2016-124738A, Nakajima also taught that quicklime powder made by blending quicklime particles both larger and smaller than 20 µm, and coating with a small amount of diethyleneglycol (0.01%), exhibited superior expansion capability in cement mortar.

While one might find calcium oxide listed as an expansive agent for concrete and other cementitious materials, it is not surprising to find other expansion agents, such as magnesium oxide or calcium sulfoaluminate, more preferred due to their less intensive hydration profiles. See e.g., U.S. Pat. No. 8,277,556 of Neal S. Berke et al. (owned by the common assignee hereof), at column 11, lines 56-59.

The present inventors believe that a novel composition and novel method for controlling the hydration of quicklime are needed.

SUMMARY OF THE INVENTION

In surmounting the disadvantages of the prior art, the present invention provides a composition wherein quicklime particles are mixed into a glycol-based organic liquid, which will preferably function in the manner of a shrinkage reducing admixture (SRA) to provide a liquid-dispensable composition in the form of a paste or slurry that can be pumped and metered into concrete.

The present inventors believe that the liquid environment provides a protective liquid barrier coating (e.g., calcium hydroxide) around the quicklime particles that helps to control hydration of calcium oxide when introduced into the aqueous environment of a concrete mix.

In other preferred embodiments, the quicklime particles are encapsulated by calcium hydroxide within a liquid organic environment generates a hydroxide barrier coating to stabilize the quicklime within the organic liquid environment paste or slurry.

In other preferred embodiments, the quicklime particles are carbonated or carboxylated, such that the presence of water and carbon dioxide or a carbon dioxide generating compound, or carboxylic acid or a carboxylic acid generating compound within the organic liquid environment, generates a carbonate-containing or carboxylate-containing barrier coating to further stabilize the quicklime within the organic liquid environment paste or slurry, and to control the hydration behavior of quicklime in cementitious material, such as concrete, by means of a barrier coating around the quicklime particles.

In contrast to the prior art, where quicklime particles are directly added into the concrete along with other admixtures (e.g., SRAs) or used only in dry powder form, or added to a concrete mixing water immediately before mixing concrete (US patent application US 2017/0008810), the present invention provides a liquid paste or slurry product that can be pumped and metered into concrete more accurately and safely, and that can be more readily dispersed into and mixed within a wet concrete or mortar.

An exemplary composition of the invention for controlling hydration of quicklime, comprises: a liquid paste or slurry formed from (A) quicklime particles comprising calcium oxide in the amount of 45-100% by dry weight based on the total weight of the quicklime particles; and (B) an organic liquid comprising an alkylene glycol, wherein the quicklime particles and alkylene glycol are present within the composition in an A:B weight ratio of 80:20 to 30:70, the alkylene glycol forming a liquid paste or slurry of the quicklime particles.

In preferred embodiments of the invention, the quicklime particles within the liquid organic environment are surrounded by the byproduct of carbonation after the quicklime particles are mixed with a carbonation agent.

An exemplary method of the invention, comprises: combining quicklime particles with an organic liquid comprising an alkylene glycol, wherein the quicklime particles and alkylene glycol are present within the composition in an A:B weight ratio of 80:20 to 30:70, to provide a paste or slurry that is pump-able and meter-able as a liquid into concrete or mortar.

In a further exemplary method of the invention, after the formed quicklime particles are dispersed within an alkyleneglycol environment to form a paste or slurry, the surface of the quicklime particles within the alkylene glycol paste or slurry environment are exposed to a carbonation agent (e.g., carbon dioxide gas) or a carboxylation agent, to form around the quicklime particles a protective barrier of carbonyl-containing or carboxyl-containing byproduct within the liquid organic environment.

Further advantages and benefits of the invention are discussed hereinafter.

BRIEF DESCRIPTION OF DRAWINGS

An appreciation of the benefits and features of the invention may be more readily grasped through consideration of the written description of preferred embodiments in conjunction with the drawings, wherein.

DETAILED DESCRIPTION OF PREFERRED EMBODIMENTS

Figure 1:
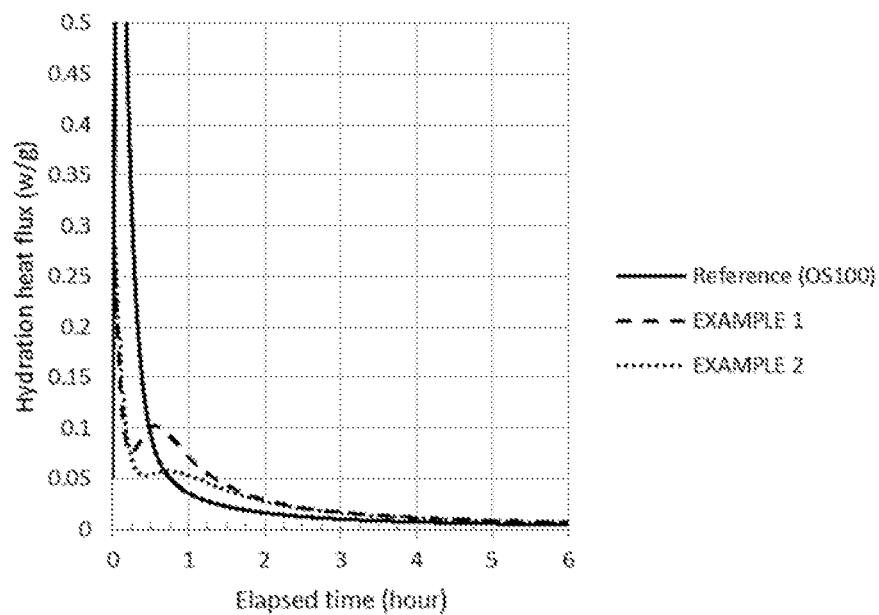
FIG. 1 illustrates hydration heat of pure untreated calcium oxide ("CaO"), CaO slurry prepared with moisture containing hexyleneglycol ("HG") (See EXAMPLE 1), and slurry prepared with HG and water (See EXAMPLE 2)

The term "quicklime" as used herein shall mean and refer to calcium oxide, which is typically manufactured from natural deposits of limestone for various industrial applications. High calcium quicklime is produced from limestone containing very high levels of calcium carbonate (e.g., >98%). Dolomitic quicklime is produced from limestone containing a mixture of both calcium and magnesium carbonates. Both high calcium quicklime and dolomitic quicklime are produced by heating raw limestone deposits in a kiln. This process is referred to as calcination. The quicklime products are often ground into a fine power referred to as pulverized quicklime.

For purposes of the present invention, the term quicklime may also include minerals such as calcium sulfate anhydrite, cement clinker compositions, i.e. calcium aluminate, calcium silicate, calcium sulfoaluminate, and others, along with calcium oxide.

The present invention relates to methods and compositions comprising: quicklime particles within a liquid organic environment that provides a liquid-dispensable paste or slurry. The composition exhibits postponement of the onset of hydration of the treated oxide particles when mixed with water, by combining the oxide particle and an organic liquid, in particular glycol. Quicklime and the organic liquid are intimately mixed, leading to a chemical reaction between the quicklime and components in the organic liquid (e.g., small amounts of dissolved water, certain hydroxyl groups within glycol, etc., optionally carbonation agents), creating a barrier or shell around the calcium oxide particles to make subsequent hydration more controllable.

The term "organic liquid" is used herein to refer to a non-aqueous solvent, which may or may not be compatible with water.

The invention also provides methods for modifying a cementitious composition, comprising: combining with a cementitious composition the above mentioned quicklime particles in an organic liquid paste or slurry.

The term "cement" as used herein includes hydratable cement and Portland cement which is produced by pulverizing clinker consisting of hydraulic calcium silicates and one or more forms of calcium sulfate (e.g., gypsum) as an interground additive. Typically, Portland cement is combined with one or more supplemental cementitious materials, such as Portland cement, fly ash, granulated blast furnace slag, limestone, natural pozzolans, or mixtures thereof, and provided as a blend. The term "cementitious" refers to materials that comprise Portland cement or which otherwise function as a binder to hold together fine aggregates (e.g., sand), coarse aggregates (e.g., crushed stone, rock, gravel), or mixtures thereof.

The term "hydratable" is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO2$ "C3S" in cement chemists notation) and dicalcium silicate ($2CaO.SiO2$, "C2S") in which the former is the dominant form, with lesser amounts of tricalcium aluminate ($3CaO.Al2O3$, "C3A") and tetracalcium aluminoferrite ($4CaO.Al2O3.Fe2O3$, "C4AF"). See e.g., Dodson, Vance H., Concrete Admixtures (Van Nostrand Reinhold, New York N.Y. 1990), page 1.

The term "concrete" will be used herein generally to refer to a hydratable cementitious mixture comprising water, cement, sand, usually a coarse aggregate such as crushed stone, rock, or gravel, and optional chemical admixture(s).

Thus, in a first exemplary aspect, the invention provides a composition for controlling hydration of quicklime, which comprises: a liquid paste or slurry formed from (A) quicklime particles comprising calcium oxide in the amount of 45-100% by dry weight based on the total weight of the quicklime particles; and (B) an organic liquid comprising an alkylene glycol, wherein the quicklime particles and alkylene glycol are present within the composition in an A:B weight ratio of 80:20 to 30:70, the alkylene glycol forming a liquid paste or slurry of the quicklime particles.

In a second exemplary aspect, which may be based on the first aspect above, the organic liquid of the composition comprises water in the amount of 0.1% to 10% weight percent based on the weight of the quicklime.

In a third exemplary aspect, which may be based on any of the first or second aspects above, the quicklime particles in the liquid organic composition are surrounded by the product of carbonation after the quicklime particles are mixed with a carbonation agent.

In a fourth exemplary aspect, which may be based on any of the first through third aspects above, the quicklime material and organic liquid being present in the composition in an A:B weight ratio of 75:25 to 55:45.

In a fifth exemplary aspect, which may be based on any of the first through fourth aspects above, the quicklime particles in the liquid composition comprises calcium oxide or a mixture of calcium oxide and magnesium oxide. Thus, in a further exemplary embodiment, the quicklime particles may comprise dolomitic quicklime which is a calcined mixture of CaO and MgO.

In a sixth exemplary aspect, which may be based on any of the first through fifth aspects above, the organic liquid of the composition is effective, when mixed with or into water, to alter the surface tension of the water.

In a seventh exemplary aspect, which may be based on any of the first through sixth aspects above, the liquid organic composition comprises a derivative of alkylene glycol chosen from ethyleneglycol, propyleneglycol, a derivative of aminoalcohol or mixture thereof.

In an eighth exemplary aspect, which may be based on any of the first through seventh aspects above, the liquid organic composition comprises an alklene glycol chosen from alkyleneglycol, dipropyleneglycolalkylethers, dipropyleneglycol, diethyleneglycol, diethyleneglycolalkylethers, propyleneglycol, ethyleneglycol, ethyleneglycolalkylethers, propyleneglycolalkylethers, oligoethyleneglycolalkyl ethers, oligopropyleneglycolalkylethers, or mixture thereof.

In a ninth exemplary aspect, which may be based on any of the first through eighth aspects above, the composition further comprises a carbonation agent that generates carbon dioxide when water is combined with the organic liquid. For example, the carbonation agent could be inorganic (e.g., injection of carbon dioxide into the organic liquid) or could be organic, or comprise both inorganic or organic forms of carbonation agents.

In a tenth exemplary aspect, based on the ninth aspect above, the composition comprises an organic carbonation agent chosen from ethylenecarbonate, propylene-carbonate, or mixture thereof.

In an eleventh exemplary aspect, which may be based on any of the first through tenth aspects above, the composition further comprises a cement dispersant polymer. For example, the cement dispersant polymer comprises a polycarboxylate ether polymer cement dispersant. Inclusion of polycarboxylate dispersants may help not only to disperse the quicklime particles more quickly into a cementitious composition, but may also help to disperse any clay agents used for increasing the thixotropy or yield stress of the liquid composition.

In a twelfth exemplary aspect, which may be based on any of the first through eleventh aspects above, the composition further comprises a clay. It is believed that clays may confer to the liquid paste or slurry compositions of the invention a thixotropic rheology, in that some shear mixing energy is necessary to move the liquid composition. Exemplary clays include calcium silicate hydrate, magnesium silicate hydrate (e.g., sepiolite), and the like. Addition of fine inorganic clay particles help the stability of quicklime slurries by providing some yield stress.

In a thirteenth exemplary aspect, based on the twelfth aspect above, the composition further comprises a clay chosen from calcium silicate hydrate, magnesium silicate hydrate (e.g., sepiolite), or mixture thereof.

In a fourteenth exemplary aspect, which may be based on any of the first through thirteenth aspects above, the composition further comprises at least one thickener. For example, the thickener may be an oligomeric or polymeric compound, such as a polyalkyleneglycolether polymer or copolymer; and such is available from BASF Corporation under the PLURONIC® brand name. The employment of organic polymeric material is believed by the inventors to work synergistically with inorganic clay agents to render further stability to the quicklime slurry or paste liquid compositions of the present invention.

In a fifteenth exemplary aspect, based on the fourteenth aspect above, the composition comprises a thickener chosen from polyalkyleneglycolether polymer or copolymer, or a mixture of polymer and copolymer.

In a sixteenth exemplary aspect, which may be based on any of the first through fifteenth aspects above, the composition comprises calcium oxide in the form of particles having a mean volume diameter smaller than 13 µm or having a mean surface diameter smaller than 4 µm. Having diameters smaller than these sizes can help to provide improved shelf life and stability to the composition.

In a seventeenth exemplary aspect, which may be based on any of the first through sixteenth aspects above, the composition comprises calcium oxide in the form of particles having a mean volume diameter greater than 13 µm or having a mean surface diameter greater than 4 µm. The present inventors believe that particles having these particle sizes helps to confer better performance in terms of expansion in concrete, but the compositions may require agitation to maintain the particles in slurry form.

In an eighteenth exemplary aspect, the invention provides a method for making the compositions (of any of the foregoing first through seventeenth aspects), wherein quicklime is first mixed with alkyleneglycol containing water, followed by addition of an organic carbonation agent chosen from an ethylenecarbonate, propylenecarbonate, or mixture thereof, or followed by addition of a carboxylation agent, the carboxylation agent chosen from alkylester of monocarboxylic acid, mono- or di-alkylester of di-carboxylic acid, or mixture thereof.

In a nineteenth exemplary aspect, based on any of the foregoing first through eighteenth aspects above, the invention provides a method comprising: combining quicklime particles with an organic liquid comprising an alkylene glycol, wherein the quicklime particles and alkylene glycol are present within the composition in an A:B weight ratio of 80:20 to 30:70, to provide a paste or slurry that is pumpable and meterable as a liquid into concrete or mortar.

In a twentieth exemplary aspect, based on any of the foregoing first through nineteenth aspects above, the method further comprises, after dispersing the formed quicklime particles within an alkylene-glycol environment to form a paste or slurry, exposing the surface of the particles within the alkylene glycol paste or slurry environment to a carbonation agent or carboxylation agent to form around the quicklime particles a protective barrier of carbonyl-containing or carboxyl-containing product within the liquid organic environment. As mentioned in the ninth and tenth aspects above, an exemplary method comprises exposing the surface of the quicklime particles in the alkylene glycol paste or slurry to an inorganic carbonation agent (carbon dioxide gas) or to an organic carbonation agent (e.g., ethylenecarbonate, propylenecarbonate, or mixture thereof).

A preferred method of making the carbonated calcium oxide particles could comprise: preparing the glycol organic liquid such as by incorporating a small amount of water and mixing the water into the liquid to ensure that it is uniformly dispersed within the organic liquid; adding the calcium oxide particles and mixing to ensure that the particles are uniformly dispersed within the organic liquid; and then introducing a carbonation agent (e.g., carbon dioxide gas, ethylene carbonate, propylene carbonate, etc.). While it may be possible to combine all three elements (liquid/particles/carbonation component) together or in different sequences, it is believed that the foregoing sequence is preferred.

In a twenty-first exemplary aspect, based on any of the foregoing first through nineteenth aspects above, the invention provides a hardened cementitious material, concrete, or mortar, substantially free from shrinkage crack up to the age of 28 days, including the quicklime composition.

In a twenty-second exemplary aspect, the invention provides a hardened cementitious material, such as a concrete or mortar, which is substantially free from shrinkage cracks for up to 28 days (from mixing), including a quicklime composition prepared prior to mixing in said cementitious material which comprises: (A) quicklime particles comprising calcium oxide in the amount of 45-100% by dry weight based on the total weight of the quicklime particles; and (B) an organic liquid comprising an alkylene glycol, wherein the quicklime particles and alkylene glycol are present within the composition in an A:B weight ratio of 80:20 to 30:70.

In a twenty-third exemplary aspect, which may be based on the twenty second aspect above, comprises water in the amount of 0.1% to 10% by weight based on the total weight of the quicklime composition.

In a twenty-fourth exemplary aspect, which may be based on any of the twenty-second or twenty-third aspects above, the quicklime particles are mixed into the organic liquid containing the alkylene glycol, and thereafter the quicklime particles are exposed to a carbonation agent.

In a twenty-fifth exemplary aspect, which may be based on any of the twenty second to twenty-fourth aspects above, the invention provides a hardened cementitious material, such as a concrete or mortar, substantially free from shrinkage cracking for up to 28 days, the hardened cementitious material being placed horizontally or as a horizontal slab or panel having a layer thickness of 0.001 cm to 100 cm, and further having a length of at least three meters between joints or joint cuts.

One of the notable features of the present invention is that the liquid organic environment provides a paste or slurry liquid environment, which is useful for controlling hydration of highly reactive, expansive quicklime. In one exemplary aspect, the combination provides a liquid barrier around quicklime particles, which may be comprised of calcium hydroxide, and, in another exemplary embodiment, of carbonation (e.g., calcium carbonate) or carboxylation byproduct, both of which are believed to delay hydration. In addition, the present invention enables a postponement of hydration, the so-called "induction period," when the carbonation or carboxylation agent is employed, which exhibits an "induction period" unlike the behavior of conventional retarding agents as typically used for oxides or cements.

In still further exemplary embodiments, which may be based on any of the foregoing exemplary aspects described above, the quicklime compositions may comprise calcium oxide, or calcium oxide with magnesium oxide, which reacts with water within 24 hours, and exhibits expansion upon reaction with water. Preferably, the quicklime particles have a mean volume diameter smaller than 13 μm, a mean volume diameter larger than 13 μm, or may comprise particles meeting both of these criteria. Preferably, the quicklime particles have a mean surface diameter larger than 4 μm, smaller than 4 μm; or both. Quicklime particles with a larger crystalline size will present a lower surface area and will typically display a higher expansion capability in concretes, along with more-easily-controlled hydration behaviors. On the other hand, smaller quicklime particles with higher surface area can provide better stability in low viscosity pastes and slurries. Thus, various particle sizes are contemplated for use in the present invention, depending upon design and application.

The quicklime particles in organic pastes and slurries, in particular the exemplary embodiments wherein the particles have calcium hydroxide, carbonation and/or carboxylation byproducts surrounding the particles within the organic liquid environment, are particularly useful for modifying masonry, mortar, shotcrete, concrete, and other hydratable cementitious compositions.

In still further exemplary embodiments, which may be based on any of the foregoing exemplary aspects described above, the quicklime compositions further comprise at least one concrete admixture. Exemplary admixtures include plasticizers or superplasticizers, and these confer favorable advantages in terms of dispersing the quicklime/organic liquid composition into the cementitious mixtures, as well as in terms of dispersing cement particles within the cementitious mixtures themselves. By choosing an appropriate organic liquid, such as alkylene glycols having shrinkage reducing admixture properties, one may achieve benefits of concrete shrink reducing ability by reducing surface tension, and may also achieve shrinkage compensation capability, due to the expansive capabilities of quicklime.

By using a specific combination of organic liquids, the quicklime hydration property is manipulated so that it offers superior crack control ability without impairing fresh concrete properties, such as slump flow and flow retention. A liquid slurry form is especially advantageous in concrete, as compared to the powder forms described in some of the prior art; the liquid slurries can be delivered to a concrete mixer safely and accurately (e.g., metered) in a readily dispersible liquid mode.

The present invention also provides a method of making the quicklime composition uniquely combined with a specific organic liquid: mixing quicklime and organic liquid (i.e. alkylene glycol) containing water, followed by the addition of carbonation agent, such as alkylene carbonate, e.g., propylenecarbonate and/or ethylenecarbonate. The sequential addition of an alkylene glycol containing water, followed by the carbonation agent, further stabilizes quicklime within slurries. The paste or slurry liquid composition comprising quicklime particles, which are surrounded by the byproduct of the carbonation agent on the quicklime particle surface, is then mixed into a cement to provide a hydratable cementitious composition (e.g., concrete) containing the hydration controlled quicklime.

The present invention thus provides cementitious compositions comprising a hydratable cementitious binder (e.g., Ordinary Portland Cement, a pozzolan, or mixture thereof as described above in this detailed section) in combination with the quicklime/organic liquid, as described in the foregoing exemplary aspects.

For example, the cementitious composition may further optionally include an aggregate and at least one chemical admixture, such as a shrink reducing agent (SRA), a plasticizer or superplasticizing admixture for allowing the cement, mortar, or concrete composition, which can be pumped through a hose and/or nozzle, so that, for example, it can be placed several floors above ground level, or, as another example, so that it can be spray-applied in the manner of shotcrete as a tunnel lining or other construction material layer.

The present invention further provides a method for modifying a cementitious composition comprising: mixing together a hydratable cementitious binder, optional aggregate and/or chemical admixture, and the quicklime/organic liquid paste or slurry, optionally wherein the quicklime particles have been treated with a carbonation agent within the organic liquid environment. In further exemplary embodiments, the quicklime/organic composition is allowed dry such that it can be mixed as a dry powder into a cementitious binder which is also a dry powder. However, it is more preferred to mix the quicklime/organic liquid as a wet paste or slurry into a wet concrete or mortar.

An exemplary method of the present invention for the quicklime composition uniquely combined with a specific organic liquid comprises: (a) calcium oxide, magnesium oxide or mixture thereof, and (b) a mixture of organic liquids with the weight ratio of (a):(b) is 30-80:70-20.

It is contemplated that one or more chemical admixtures for modifying concrete or mortar may be used in the methods and compositions of the present invention for modifying cementitious materials with which the quicklime/organic liquid composition are combined. These chemical admixtures may include, without limitation, a shrinkage reducing admixture such as commercially available from GCP Applied Technologies, Cambridge, Mass. USA under the trademarks Eclipse® and Tetraguard® as well as other glycol-based SRA products), water-reducing admixtures (such as lignin sulfonate, naphthalene sulfonate formaldehyde condensate (NSFC), melamine sulfonate formaldehyde condensate (MSFC), polycarboxylate comb polymers (containing alkylene oxide groups such as "EO" and/or "PO" groups), gluconate, and the like); set retarding admixtures; set accelerating admixtures; air entraining agents; air detraining agents (defoamers); surface active agents; and combinations of any of the foregoing.

Of the conventional concrete or mortar admixtures, the EO-PO type polymers, which have ethylene oxide ("EO") and/or propylene oxide ("PO") groups and polycarboxylate groups, are preferred. Cement dispersants contemplated for use in methods and compositions of the invention include EO-PO polymers and EO-PO comb polymers, as described for example in U.S. Pat. Nos. 6,352,952 B1 and 6,670,415 B2 of Jardine et al., which mentioned the polymers taught in U.S. Pat. No. 5,393,343 (GCP Applied Technologies, Inc.). These polymers are available from GCP Applied Technologies Inc., 62 Whittemore Avenue, Cambridge, Mass., USA, under the federally registered trademark ADVA®.

Another exemplary cement dispersant polymer, also containing EO/PO groups, is obtained by polymerization of maleic anhydride and an ethylenically-polymerizable polyalkylene, as taught in U.S. Pat. No. 4,471,100. In addition, EO/PO-group-containing cement dispersant polymers are taught in U.S. Pat. Nos. 5,661,206 and 6,569,234. The amount of such polycarboxylate cement dispersants used within concrete may be in accordance with conventional use (e.g., 0.05% to 0.25% based on weight of active polymer to weight of cementitious material).

Exemplary compositions of the present invention may comprise, in addition to the quicklime composition uniquely combined with a specific organic liquid and cementitious binder, at least one chemical admixture selected from the group of shrinkage reducing agent (SRA), water reducing agents (e.g., lignin sulfonate, naphthalene sulfonate formaldehyde condensate (NSFC), melamine sulfonate formaldehyde condensate (MSFC), polycarboxylate comb polymers (containing alkylene oxide groups such as "EO" and/or "PO" groups), gluconate, and the like); set retarders; set accelerators; defoamers; air entraining agents; surface active agents; and mixtures thereof.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention and comparative examples wherein the embodiments of the claimed invention are shown to obtain performance objectives not disclosed or suggested in the prior art. It should be understood, moreover, that the invention is not limited to the specific details set forth in the examples.

EXAMPLES

Mixture Preparation and Hydration Behavior

Examples 1 to 3

Calcium oxide (quicklime) (available commercially under the brand name PetroCal® OS100, Mississippi Lime Co., St. Louis, Mo.) was mixed with a mixture of organic liquid as shown in Table 1. According to Karl-Fisher analysis, the hexyleneglycol (HG) used in the examples contained 1.22%±0.01% (0.84% RSD). The slurry samples were aged for three days. Another hydration measurement was conducted at the age of 10 days.

The resultant slurry, paste or powder was subjected to calorimetric study whereby its hydration behavior could be analyzed over time. A calorimeter, a CALMETRIX I-Cal 8000™ device, was used for this analysis. Samples containing 1 gram of CaO were mixed with 2 mL of lime saturated water containing 1.4% potassium sulfate (K2SO4). The slurry was mixed quickly and placed in the calorimeter at a temperature of 21° C.

TABLE 1

Test mixture compositions with high moisture hexyleneglycol (HG)

| | Calcium oxide (CaO) | Hexyleneglycol (HG) | Water (H$_2$O) | Propylenecarbonate (PrC) |
|---|---|---|---|---|
| Example 1 (0022-32) | 3 g | 1.13 g | — | — |
| Example 2 (0022-32A) | 3 g | 1.14 g | 0.15 g | — |
| Example 3 (0022-32B) | 3 g | 1.13 g | 0.16 g | 0.27 g |

Figure 2:
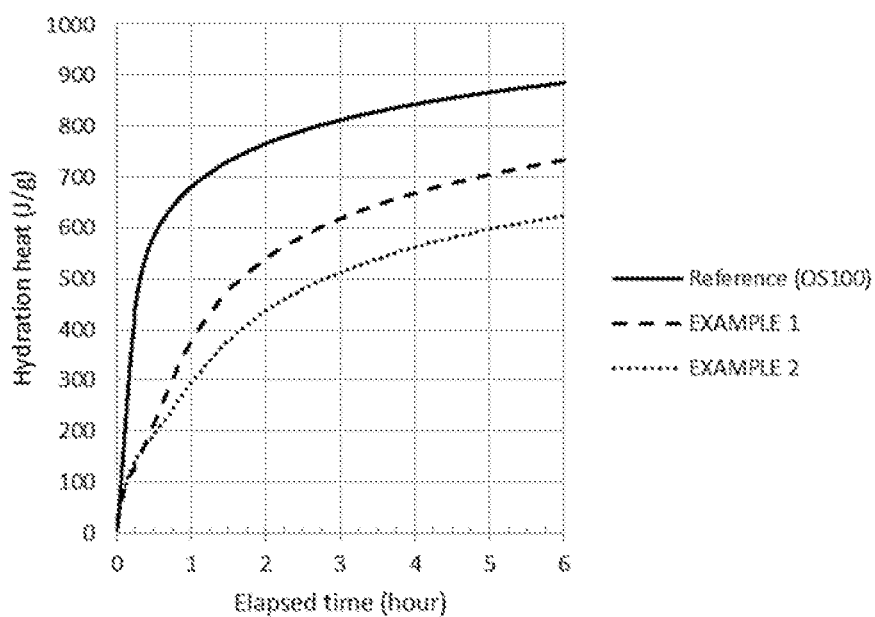
FIG. 2 illustrates hydration heat of untreated CaO, CaO slurry prepared with moisture containing HG (See EXAMPLE 1), and slurry prepared with HG and water (See EXAMPLE 2)

FIG. 1 illustrates graphically that, by treating calcium oxide (CaO) with moisture containing organic liquid, hexyleneglycol (HG), delayed hydration peak appears at about 40 minutes. Additional water delayed the peak time but not significant (Example 2). As shown in FIG. 2, the early hydration of calcium oxide can be significantly reduced by pre-mixing with moisture containing glycol.

Figure 3:
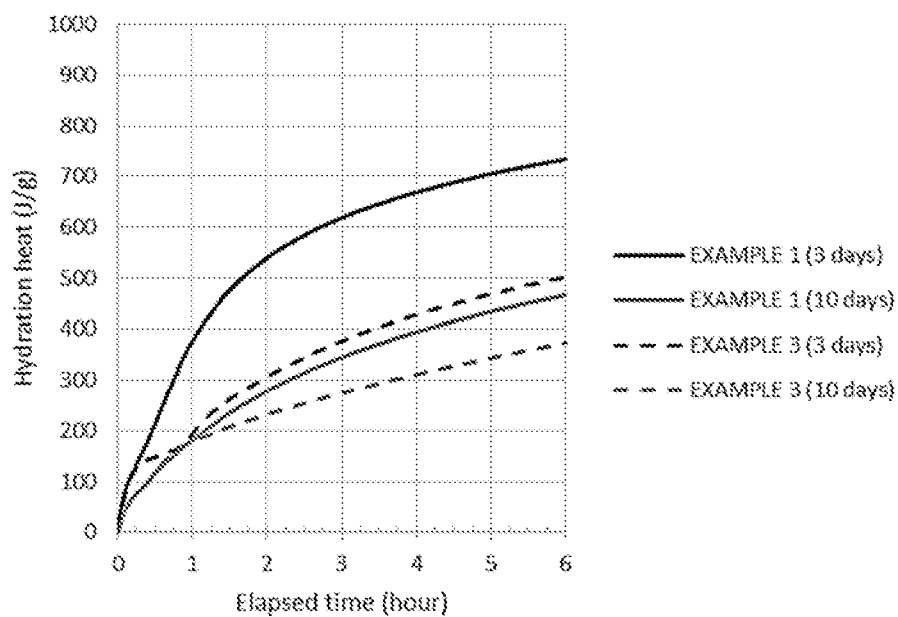
FIG. 3 illustrates hydration heat of untreated CaO, slurry prepared with moisture containing HG (See EXAMPLE 1), and slurry prepared with HG, water, and propylenecarbonate ("PrC") (See EXAMPLE 3)

FIG. 3 illustrates graphically the hydration behavior of the CaO and HG mixture of Example 1 and the mixture containing propylene carbonate (PrC) of Example 3. The samples were aged for 10 days. Although moisture in glycol can offer some control of hydration, the mixture of Example 1 slowly continued to hydrate over 10 days. The results suggest that the mixture of Example 1 should be used rather quickly after its preparation. On the other hand, the material treated with PrC (Example 3) maintains the hydratable CaO even after 10 days, although a larger part of CaO was hydrated upon preparation. The mixture of Example 3 is more desirable if the material is to be stored a certain period.

Examples 4 to 6

Calcium oxide (quicklime) (available commercially under the brand name PetroCal® OS100, Mississippi Lime Co., St. Louis, Mo.) was mixed with a mixture of organic liquid as shown in Table 2. According to Karl-Fisher analysis, the hexyleneglycol (HG) used in the examples contained 0.54%±0.01% (1.55% RSD). Polyethyleleglycol (PEG) with molecular weight 10,000 g/mol was added to stability of CaO and HG slurry or suspension by preventing CaO sedimentation in Example 5. PEG was heated and pre-mixed with HG.

TABLE 2

Test mixture compositions with low moisture hexyleneglycol, HG.

| | CaO | HG | $H_2O$ | PrC | PEG |
|---|---|---|---|---|---|
| Example 4 (0022-34C) | 13.3 g | 5.0 g | — | — | |
| Example 5 (0022-34D) | 13.5 g | 5.0 g | — | — | 0.53 g |
| Example 6 (0022-34B) | 13.7 g | 5.1 g | 0.73 g | 1.03 g | |

Figure 4:
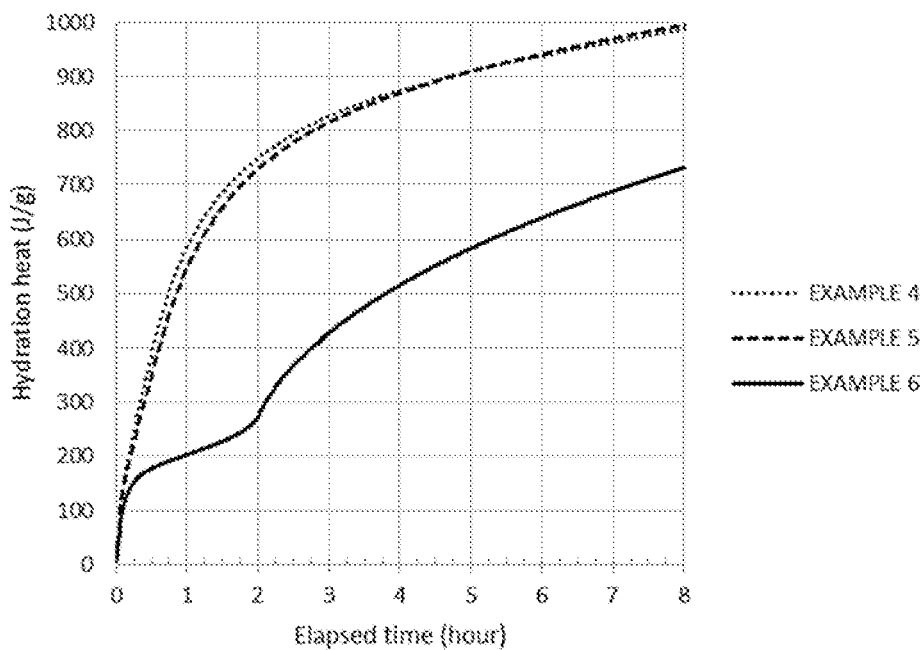
FIG. 4 illustrates hydration heat of mixtures prepared with low moisture HG (See EXAMPLE 4), with HG and polyetheyleglycol ("PEG") (See EXAMPLE 5), and with HG, water, and PrC (See EXAMPLE 6)

FIG. 4 graphically illustrates calorimetry data reflecting hydration behavior of the slurries. As shown in FIG. 4, the addition of water and PrC creates 2 hour induction time of CaO hydration. The induction time is beneficial for concrete shrinkage reduction applications because expansion is most desirable after initial setting of concrete.

Examples 7 and 8

Calcium oxide (quicklime) (available commercially under the brand name PetroCal® OS100, Mississippi Lime Co., St. Louis, Mo.) was mixed with a mixture of organic liquid as shown in Table 3. According to Karl-Fisher analysis, the hexyleneglycol (HG) used in the examples contained 1.22%±0.01% (0.84% RSD). Polyethyleleglycol (PEG) with molecular weight 10,000 g/mol was added to stability of CaO and HG slurry or suspension by preventing CaO sedimentation. PEG was heated and pre-mixed with HG.

TABLE 3

Test mixture compositions with high moisture hexyleneglycol (HG).

| | CaO | HG | PrC | PEG |
|---|---|---|---|---|
| Example 7 (0022-39B) | 14 g | 4.0 g | — | 0.4 g |
| Example 8 (0022-39C) | 14 g | 4.0 g | 1.0 g | 0.4 g |

Figure 5:
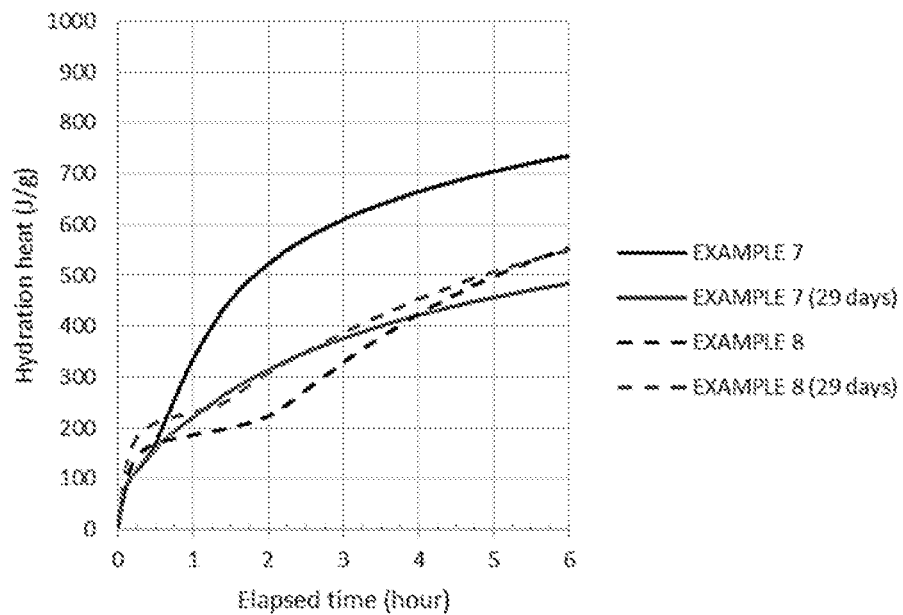
FIG. 5 illustrates hydration heat of mixtures prepared with high moisture HG, and PEG (See EXAMPLE 7), and with HG, PrC, and PEG (See EXAMPLE 8)

FIG. 5 graphically illustrates calorimetry data reflecting hydration behavior. The PrC treated sample (Example 8) again showed distinctive induction time. The slurry of Example 8 also showed further improved storage stability against CaO pre-hydration.

Examples 9 and 11

Calcium oxide (quicklime) (available commercially under the brand name PolyCal® OS325, Mississippi Lime Co., St. Louis, Mo.) was mixed with a mixture of organic liquid as shown in Table 4 and 5. According to Karl-Fisher analysis, the hexyleneglycol (HG) used in the examples contained 1.22%±0.01% (0.84% RSD). Dipropyleneglycol was employed to dilute the slurry. Polyethyleleglycol (PEG) with molecular weight 10,000 g/mol was added to stability of CaO and HG slurry in Example 11.

Figure 6:
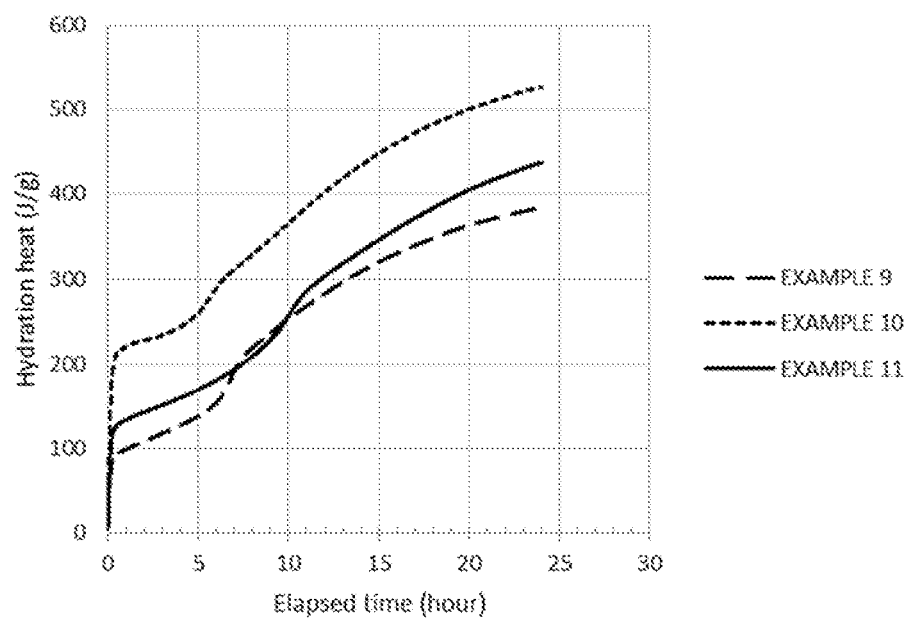
FIG. 6 illustrates hydration heat of mixtures prepared with finer CaO, high moisture HG, high moisture glycerin, PrC, and dipropyleneglycol ("DPG") (See EXAMPLES 9 and 10), and with HG, dry glycerin, PrC, and PEG (See EXAMPLE 11)

FIG. 6 graphically illustrates calorimetry data reflecting hydration behavior. These examples showed induction time of 5 to 10 hours. The examples demonstrate CaO hydration can be further controlled by employing glycerin.

TABLE 4

Test mixture compositions with finer CaO, high moisture hexyleneglycol (HG), and high moisture glycerin.

| | CaO | HG | High moisture Glycerin | PrC | Dipropyleneglycol (DPG) |
|---|---|---|---|---|---|
| Example 9 (0022-50A) | 15.1 g | 5.5 g | 2.1 g | 1.2 g | 3.0 g |
| Example 10 (0022-50C) | 15.1 g | 5.5 g | 1.2 g | 2.0 g | 3.0 g |

TABLE 5

Test mixture compositions with finer CaO, high moisture hexyleneglycol (HG), and dry glycerin.

| | CaO | HG | Low moisture Glycerin | PrC | DPG | PEG |
|---|---|---|---|---|---|---|
| Example 11 (0022-50B) | 15 g | 5.6 g | 2.0 g | 1.1 g | 3.1 g | 0.4 g |

Mortar Shrinkage Reducing Performance Test

Mortar shrinkage test of the samples was carried out based on ASTM C157 except that measurement of the length of the mortar specimen was started right after the specimens were demolded at 24 hours, but without wet curing. This modification of the test was done to make the measurement closer to field performance of the shrink reducing admixtures. It should be noted, however, the test still cannot account for the contribution from CaO expansion that occurred before 24 hours for shrinkage reduction.

Example 12-15

A mortar sample was made in accordance with the mix design shown in Table 6. A defoamer was used to control air (ADVA® CAST 575 defoamer from GCP Applied Technologies, Cambridge, Mass. USA). Table 7 shows the slurry mixtures of the present invention with variety of quicklime products from different producers. Table 7 also shows the reactivity of the products according to their product data sheet.

TABLE 6

Mortar mix design for shrinkage test

| | EN-sand | Cement | Water | Superplasticizer | Shrink reduction admixture |
|---|---|---|---|---|---|
| Mortar mix design | 1350 g | 533 g | 234 g | 0.06% bwoc | CaO: 2.5% bwoc HG: 0.93% bwoc |

TABLE 7

Mortar test sample mixtures prepared with various CaO and hexyleneglycol (HG).

| | CaO Product | Manufacturer | T 30 sec ** (° C.) | T180 sec ** (° C.) | Slurry CaO/HG (grams) |
|---|---|---|---|---|---|
| Blank | na* | na* | na* | | 0 |
| EXAMPLE 12 (0022-39-1) | Pulverized Quicklime 325 | Mississippi Lime | 33 | 53 | 13.35/5.0 |
| EXAMPLE 13 (0022-39-2) | Pulverized Calcium Oxide | Carmuse USA | na* | 47 | 13.33/5.0 |
| EXAMPLE 14 (0022-39-3) | Ground Lime | Graymont | 21 | 44 | 13.36/5.0 |
| EXAMPLE 15 (0022-39-4) | Petrocal OS100 | Mississippi Lime | 11 | 33 | 13.33/5.0 |

*not applicable
** Reactivity or Slaking rate (ASTM C110, AWWA 8202) T 30: Temperature Rise in 30 second; T 180: Temperature rise in 3 minutes. The numbers are from manufacturers' data sheets.

Figure 7:
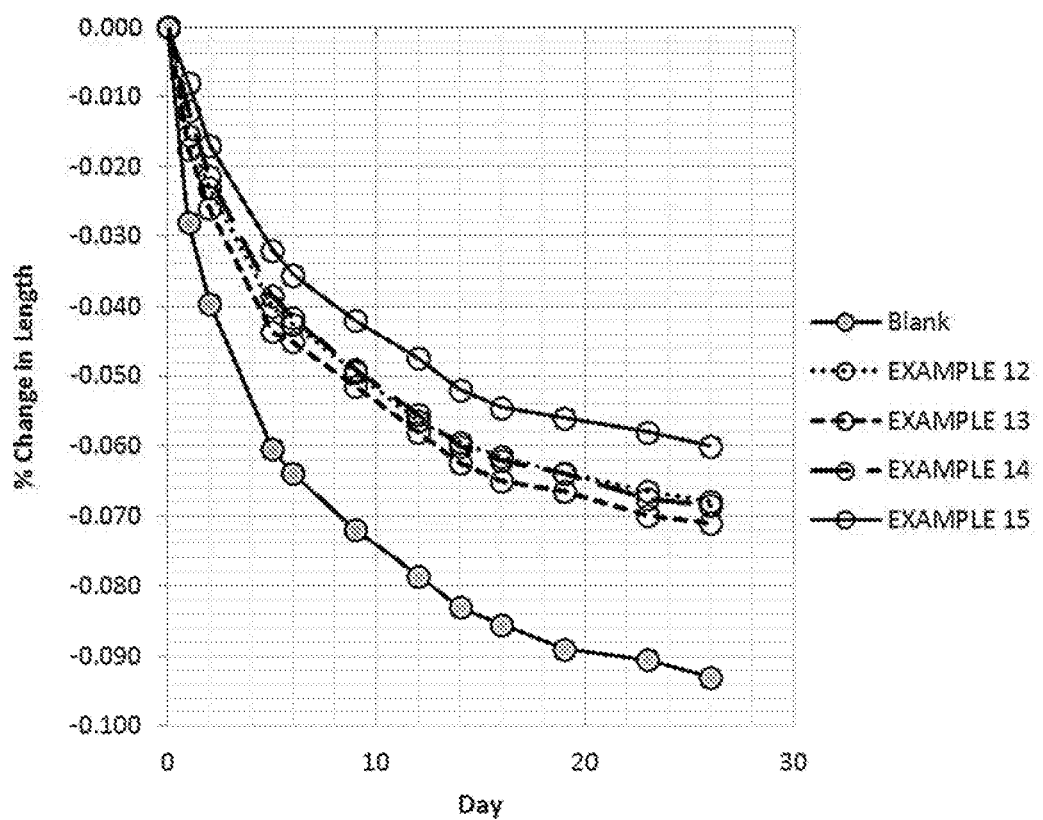
FIG. 7 illustrates mortar shrinkage results of the CaO/HG slurries of EXAMPLE 12 to EXAMPLE 15.

FIG. 7 graphically illustrates shrinkage results of the mortar specimens prepared with the CaO slurries in Table 7. As shown in FIG. 7, the mixtures of the present invitation demonstrated significant reduction in mortar shrinkage. The shrinkage reduction performance of the slurry mixtures of the present invention is equivalent to or better than the HG alone at 1.86% by weight of cement (bwoc) in the present mortar mix design and testing protocol. It is evident in FIG. 7 that the CaO with lower reactivity generally exhibits better shrink reduction performance.

Figure 8:
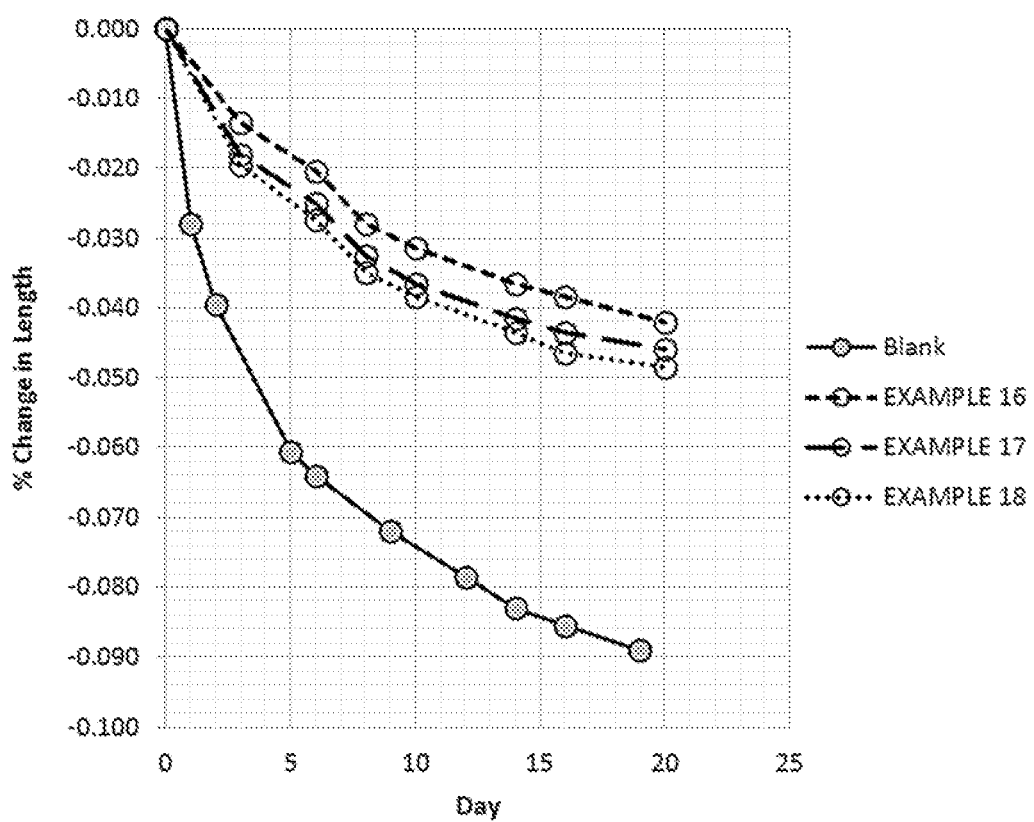
FIG. 8 illustrates mortar shrinkage results of EXAMPLES 16 to 18 using the slurries of EXAMPLES 4 to 6.

FIG. 8 shows shrinkage test results of the mortar specimens prepared with the CaO slurries of Example 4 to 6 shown in Table 8. As seen in FIG. 8, the slurry mixtures of the present invitation showed significant reduction in mortar shrinkage. The shrinkage reduction performance of the slurry mixtures of the present invention is equivalent to or better than the HG alone at 1.86% by weight of cement in the present mortar mix design and testing protocol.

TABLE 8

Mortar mix design for shrinkage test for the slurries of Example 4 to 6.

| | EN-sand | Cement | Water | Shrink reduction admixture | amount |
|---|---|---|---|---|---|
| Example 16 | 1350 g | 533 g | 240 g | Example 4 (0022-34C) | 17.8 g |
| Example 17 | 1350 g | 533 g | 240 g | Example 5 (0022-34D) | 18.5 g |
| Example 18 | 1350 g | 533 g | 240 g | Example 6 (0022-34B) | 19.9 g |

Concrete Shrinkage Reducing Performance Test

Example 19

Table 9 indicates two concrete ring experiments with crack reducing additives of the present invention. The ring experiment was performed according to ASTM C1581. Concrete had cement factor of 750 lbs./yd$^3$ or 445 kg/m$^3$, w/c=0.45. Slump was adjusted to 8-9 inches by using a superplasticizer (ADVA® CAST 575 from GCP Applied Technologies, Cambridge Mass.). For ECLIPSE® Shrinkage Reducing Admixture (from GCP Applied Technologies) and MASTERLIFE® CRA007 Shrinkage Reducing Admixture (from BASF Construction Chemicals division), mixing water was adjusted based on the volume of the liquids. For PreVENT-C500® (from Premier Magnesia LLC), additional superplasticizer was applied to get the same slump as the control sample.

The CaO slurry of the present invention was prepared by mixing 475 grams of OS100 and 170 grams of high moisture HG. For the second concrete test, the CaO slurry was also contained 12 grams of PEG.

The sample made using the ECLIPSE® Shrinkage Reducing Admixture ("SRA") cracked after 63 days exposure to 50% RH and 70° F. The sample made with example slurry cracked after 104 days. The control sample failed after 21 days and the sample made with PreVENT-C500® Admixture failed after 26 days. In the second test, rings made with ECLIPSE® SRA and MASTERLIFE® CRA007 SRA cracked after 42 and 41 days, respectively. The control sample failed after 13 days. Rings made with the Calcium Oxide slurry of the present invention continue to show no signs of cracking after 91 days.

TABLE 9

Number of days to cracking for concrete mixes made with shrinkage and cracking reducing admixtures. ASTM C1581, Cement factor 750 lb/yd$^3$, w/c =0.45, 50% RH and 70° F.

| | Sample | Crack date (1st test/2nd test) |
|---|---|---|
| Control concrete mix | Control Mix | 21/18 days |
| Reference concrete 1 | Eclipse ® (GCP Applied Technologies) @30 oz/cwt | 63/42 days |
| Reference concrete 2 | MasterLife CRA 007 ® (BASF construction chemicals division) @30 oz/cwt | na*/41 days |
| Reference concrete 3 | PreVENT C-500 (Premier Magnesia LLC) @5% | 26/na* days |

TABLE 9-continued

Number of days to cracking for concrete mixes made with shrinkage and cracking reducing admixtures. ASTM C1581, Cement factor 750 lb/yd³, w/c =0.45, 50% RH and 70° F.

| Sample | | Crack date (1st test/2nd test) |
|---|---|---|
| Example 19 | CaO/HG slurry (@2% bwoc CaO + 1% bwoc HG) | 104/>105 days** |

*Data not available
**No crack has been observed at 105 days.

Slurry Preparation Method

Example 20

An exemplary calcium oxide slurry of the present invention was prepared using the following components: Polyetheyleneglycol (PEG) with nominal molecular weight of 4,500 (2 grams) and sepiolite clay powder (available under the PANGEL® S9 tradename from Tolsa) (1 grams) were mixed in solvent mixture of dipropyleneglycol-n-butylether (DPnB) (30 grams), dipropyleneglycol (DPG) (30 grams), propylenecarbonate (PrC) (8 grams) and 60% aqueous solution of a commercial polycarboxylate cement dispersant (available from Nippon Shokubai K.K.) (2 grams) with a high shear mixer. Calcium oxide powder, available under the POLYCAL® OS325 brand name, and (Mississippi Lime) (180 grams), were then added to the above suspension and well mixed for 2 hours using a 2" 4-blade propeller at 500-1,000 rpm to yield a thick paint-like slurry.

The obtained slurry was mixed in mortar and showed a superior shrinkage control.

Example 21

An exemplary calcium oxide slurry of the present invention was prepared using the following components: Polyetheyleneglycol polypropyleneglycol block copolymer (available from BASF Corporation under the PLURONIC® F127 tradename) (1 grams) and sepiolite clay powder (PANGEL® S9 brand available from Tolsa) (2 grams) were mixed in solvent mixture of dipropyleneglycol-n-butylether (DPnB) (30 grams), dipropyleneglycol (DPG) (30 grams), propylenecarbonate (PrC) (8 grams), a commercial polycarboxylate cement dispersant (available from Nippon Shokubai K.K.) (2 grams) and an additional small amount of water (3 grams) with high shear mixer. Calcium oxide powder, POLYCAL® OS325 (Mississippi Lime) (180 grams), was then added to the above suspension and well mixed for 2 hours using a two-inch 4-blade propeller at 500-1,000 rpm followed by an additional mixing for another 2 hours with a low-shear puddle mixer to yield a thick paint-like slurry.

The obtained slurry was mixed in mortar and showed a superior shrinkage control.

Example 22

An exemplary calcium oxide slurry of the present invention was prepared using the following components: Polyetheyleneglycol polypropyleneglycol block copolymer (PLURONIC® F127, BASF Corp.) (1 grams) was dissolved or well dispersed in dipropyleneglycol (DPG) (30 grams) and water (2 grams). Dipropyleneglycol-n-butylether (DPnB) (30 grams), a commercial polycarboxylate cement dispersant (Nippon Shokubai K.K.) (2 grams) and sepiolite clay powder (PANGEL® S9 brand from Tolsa) (2 grams) were then added and mixed well. Calcium oxide powder, Polycal OS325 (Mississippi Lime) (180 grams), was then added to the above liquid and well mixed for 1 hour using a two-inch 4-blade propeller at 500-1,000 rpm. After quicklime was well mixed and dispersed in the liquid, propylenecarbonate (PrC) (4 grams) was then added and an additional mixing for another 2 hours to complete the encapsulation reaction.

The obtained slurry showed superior storage stability and a superior shrinkage control in the cement mortar test.

The foregoing examples and embodiments were provided for illustrative purposes, and not intended to delimit the scope of the invention.

It is claimed:

1. An exemplary composition of the invention for controlling hydration of quicklime, comprises: a liquid paste or slurry formed from (A) quicklime particles comprising calcium oxide in the amount of 45-100% by dry weight based on the total weight of the quicklime particles; and (B) an organic liquid comprising an alkylene glycol, wherein the quicklime particles and alkylene glycol are present within the composition in an A:B weight ratio of 80:20 to 30:70, the alkylene glycol forming a liquid paste or slurry of the quicklime particles; and further wherein the organic liquid of component (B) comprises water in the amount of 0.1% to 10% percent based on the weight of the quicklime particles of component (A).

2. The composition of claim 1 wherein the quicklime particles are surrounded by a byproduct of carbonation after the quicklime particles within the liquid paste or slurry are mixed with a carbonation agent.

3. The composition of claim 1 wherein the quicklime particles and organic liquid are present in the composition in an A:B weight ratio of 75:25 to 55:45.

4. The composition of claim 1 wherein the quicklime particles comprises calcium oxide or a mixture of calcium oxide and magnesium oxide.

5. The composition of claim 1 wherein the organic liquid is effective when mixed with or into water to alter surface tension of the water.

6. The composition of claim 3 wherein the alklene glycol is chosen from a derivative of ethyleneglycol, propyleneglycol, a derivative of aminoalcohol or mixture thereof.

7. The composition of claim 3 wherein the organic liquid is chosen from alkyleneglycol, dipropyleneglycolalkylethers, dipropyleneglycol, diethyleneglycol, diethyleneglycolalkylethers, propylene-glycol, ethyleneglycol, ethyleneglycolalkylethers, propyleneglycol-alkylethers, oligoethyleneglycolalkylethers, oligopropyleneglycolalkylethers, or mixtures thereof.

8. The composition of claim 1 further comprising a carbonation agent.

9. The composition of claim 8 wherein the carbonation agent is an organic carbonation agent chosen from ethylenecarbonate, propylenecarbonate, or mixture thereof.

10. The composition of claim 1 further comprising a polycarboxylate ether polymer cement dispersant.

11. The composition of claim 1 further comprising a clay.

12. The composition of claim 11 wherein the clay is chosen from calcium silicate hydrate, magnesium silicate hydrate, or mixture thereof.

13. The composition of claim 1 further comprising at least one thickener.

14. The composition of claim 13 wherein the thickener is chosen from a polyalkyleneglycolether polymer or copolymer.

15. The composition of claim 1 wherein the calcium oxide is in the form of particles having a mean volume diameter smaller than 13 μm or having a mean surface diameter smaller than 4 μm.

16. The composition of claim 1 wherein the calcium oxide is in the form of particles having a mean volume diameter greater than 13 μm or having a mean surface diameter greater than 4 μm.

17. A method of making the composition of claim 1 wherein the quicklime is first mixed with alkyleneglycol containing water, followed by addition of an organic carbonation agent chosen from an ethylenecarbonate, propylenecarbonate, or mixture thereof, or followed by addition of a carboxylation agent, the carboxylation agent chosen from alkylester of monocarboxylic acid, mono- or di-alkylester of di-carboxylic acid.

18. A hardened cementitious material substantially free of shrinkage crack up to the age of 28 days, the cementitious material comprising the quicklime composition provided in accordance with claim 1.

19. A method for treating quicklime, comprising: combining quicklime particles with an organic liquid composition comprising an alkylene glycol, wherein the quicklime particles and alkylene glycol are present within the liquid composition in an A:B weight ratio of 80:20 to 30:70, to provide a paste or slurry that is pumpable and meterable as a liquid into concrete or mortar; and further wherein, after dispersing the quicklime particles within an alkylene-glycol environment to form a paste or slurry, the method further comprises exposing the surface of the quicklime particles within the alkylene glycol paste or slurry environment to a carbonation agent or carboxylation agent to form around the quicklime particles a protective barrier of carbonyl-containing or carboxyl-containing byproduct within a liquid organic environment.

20. A hardened cementitious material, concrete, or mortar, substantially free of shrinkage crack up to the age of 28 days, including a quicklime composition prepared prior to mixing in said cementitious material, concrete or mortar, which comprises: (A) quicklime particles comprising calcium oxide in the amount of 45-100% by dry weight based on the total weight of the quicklime particles; and (B) an organic liquid comprising an alkylene glycol, wherein the quicklime particles and alkylene glycol are present within the composition in an A:B weight ratio of 80:20 to 30:70.

21. The hardened cementitious material of claim 20, wherein the organic liquid comprises water in the amount of 0.1% to 10% weight percent based on the total weight of the quicklime composition.

22. The hardened cementitious material of claim 20 wherein the quicklime particles are surrounded by a byproduct of carbonation after the quicklime particles are mixed with a carbonation agent.

23. The hardened cementitious material of claim 20 being formed into a slab or panel having a thickness of 0.001 cm to 100 cm, optionally having a length of at least of at least 3 meters between joints.

* * * * *